Patented Apr. 9, 1929.

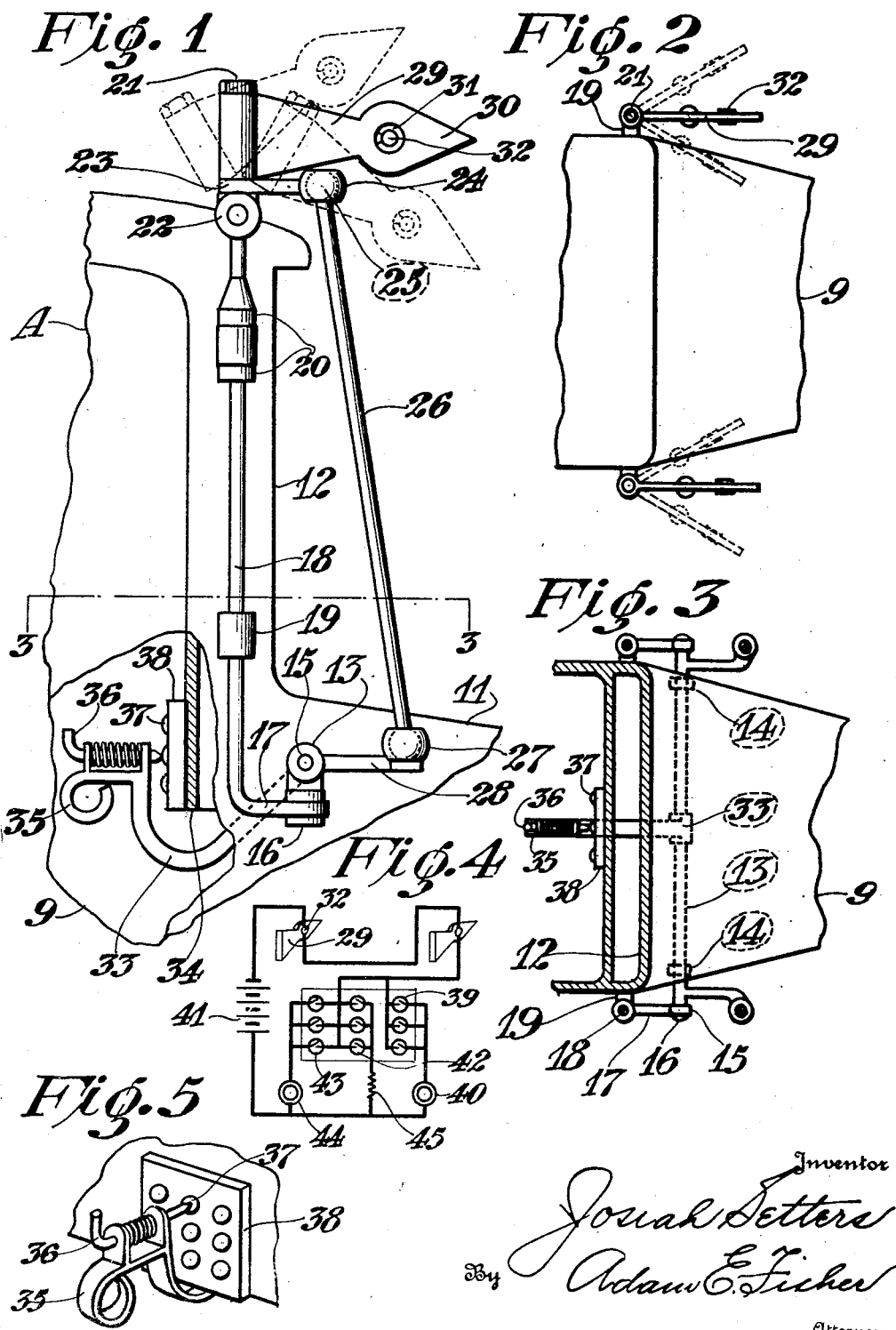

1,708,742

UNITED STATES PATENT OFFICE.

JOSIAH SETTERS, OF ROCKLAND, IDAHO.

TRAFFIC SIGNAL FOR AUTOMOBILES.

Application filed November 19, 1926, Serial No. 149,238. Renewed September 7, 1928.

My invention relates to traffic signals for automobiles, and particularly to traffic signals intended to be operated by the hand of the driver of the automobile, whereby an indication of the intention of the driver may be communicated to other drivers and also to pedestrians.

Another object of my invention is to provide such a means in which a number of such indications may be given, as for example, turning to right or left, straight ahead, stop or reverse, parking signal or service station signal, or combinations thereof.

With the above and other objects in view, my invention consists in the combination and arrangement of parts hereinafter described and claimed, it being understood that, within the scope of what is claimed, changes may be made in the precise embodiment shown without departing from the spirit of the invention.

In the drawings

Figure 1 is a side elevation of my invention as applied to an automobile, with parts thereof cut away;

Figure 2 is a top plan view of my invention;

Figure 3 is a sectional view along the line 3—3 of Figure 1;

Figure 4 is a diagrammatic view of the electrical connections;

Figure 5 is a perspective view of the switch board and operating handle.

Referring now more particularly to the drawings, A refers to the cowl 11 and windshield portion 12 of an automobile body 9. A shaft 13 is rotatably and slidably positioned transversely the cowl 11 through bearings 14, and is journaled in the bearings 15 provided in the eye bolt 16 journaled in the crank 17 affixed on the vertically extending shaft 18 journaled in the brackets 19 affixed to both sides of the said windshield 12. Collars 20 are positioned on the said vertical shaft 18 on either side of one of the brackets 19 so as to restrict the said shaft 18 to a rotary movement.

An eye bolt 21 is pivoted to the upper end of the shaft 18 as shown at 22. An arm 23 is positioned on the said eye bolt, and has provided on its end a socket 24 suitably to receive the ball end 25 of the articulated link 26 pivoted to the socket 27 positioned in the arm 28 affixed to the shaft 13.

Vanes 29 are positioned on the eye bolt 21, and are formed at their ends with an arrow point as at 30, having provided therein an aperture 31 suitably to receive an electric lamp 32.

Positioned medially the shaft 13 is the arcuate arm 33 extending rearwardly the dash 34 of the body 9. The said arm 33 curves upwardly rearwardly the said dash 34 and terminates in the handle 35 having slidably positioned thereon the spring set plunger 36 adapted to engage the push button switches 37 positioned on the switch board 38.

In the embodiment shown, the switches 37 are arranged in three vertical rows with three switches in each row, but it is obvious that a greater or less number of switches may be used in any desired arrangement.

In the embodiment shown, the right hand row of switches, 39, is electrically connected to a suitable signal lamp positioned on the right rear fender as indicated diagrammatically at 40, and thence to the battery 41; the center row of switches, 42, is connected direct to the battery 41 through the resistance 45; and the left hand row of switches, 43, is connected to a suitable signal lamp positioned on the left rear fender as at 44. The electrical circuit is completed by connecting the battery to the lamps 32 of the vanes 29 in series and thence to all the push buttons as indicated diagrammatically in Figure 4.

In the operation of the device, the plunger 36 being retracted, the handle 35 is grasped by the operator whereby the shaft 13 may be rotated and moved transversely the body 9 so as to permit the plunger 36 to be positioned opposite any one of the said buttons 37, whereupon the electrical circuit is completed and the lamps suitable to the indication caused to be illuminated. At the same time, the vanes 29 are caused to swing to right or left and up or down by the movement of the handle. In the position of the handle shown in Figure 5, the vanes 29 will point straight ahead and upwardly and only the lamps 32 in the vanes will be illuminated.

It is obvious that the switch board 38 serves not only to illuminate the appropriate signals but also acts to inform the operator of the signal he is giving, suitable legend (not shown) being shown upon the switch board for this purpose.

It is obvious that the vanes 29 are by my invention articulatably mounted on the automobile body 9 so as to be capable of presenting a greater number of indications than can customarily be shown by traffic signals now in use.

I claim:

A traffic signal for automobiles, in combination with the cowl, dash and windshield thereof, comprising a transverse shaft rotatably and slidably positioned through said cowl; vertically extending shafts rotatably positioned on both sides of said windshield; cranks provided on the lower end of said vertical shafts; eye bolts vertically pivoted in said cranks and having the said transverse shaft journaled therein; vanes pivotably connected to the upper end of said vertical shafts; forwardly extending arms positioned on the ends of said transverse shaft; links articulatably connecting said vanes with said arms; a rearwardly extending arcuate arm positioned medially said transverse shaft; and a spring set plunger slidably positioned on said arcuate arm.

In testimony whereof I affix my signature.

JOSIAH SETTERS.